UNITED STATES PATENT OFFICE.

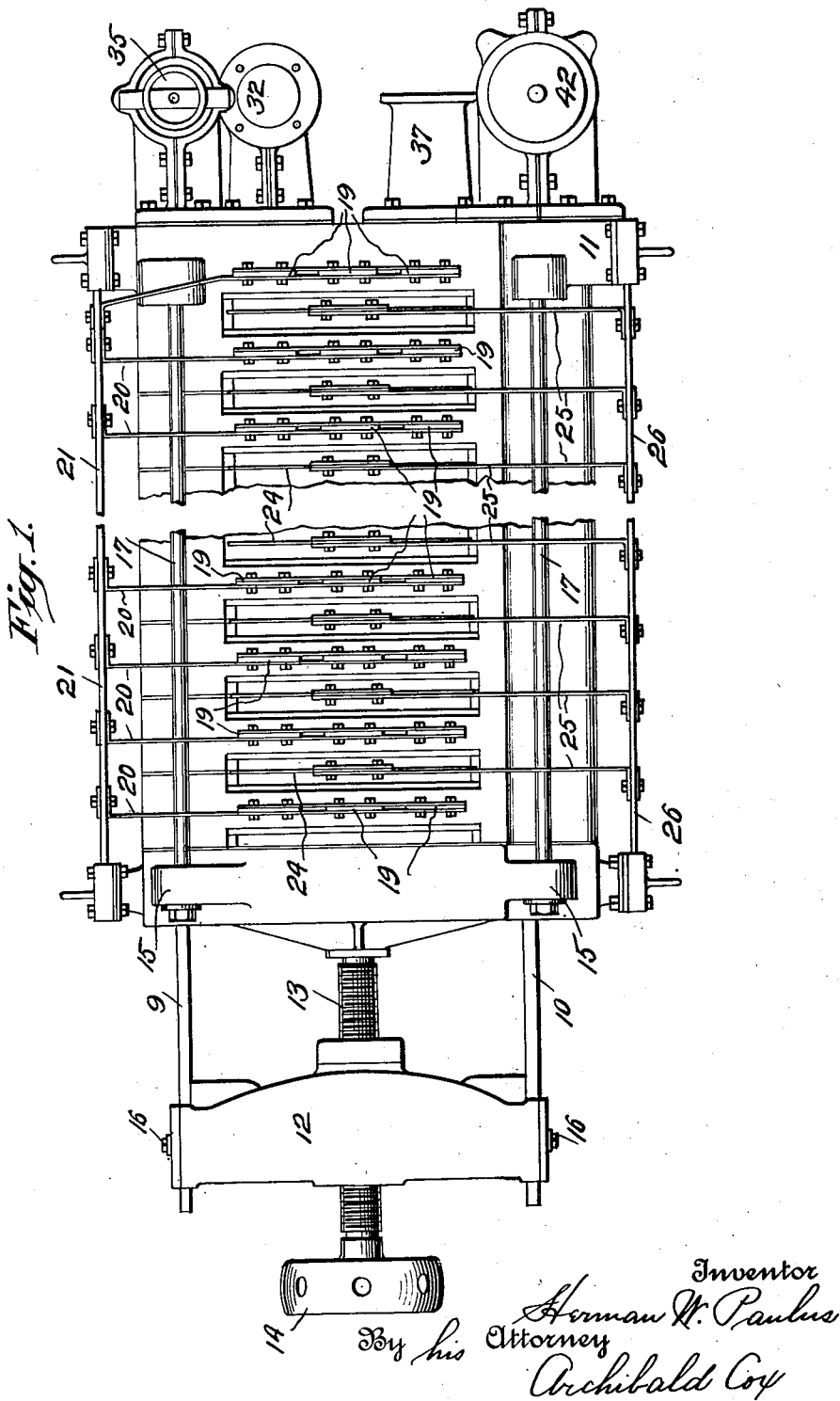

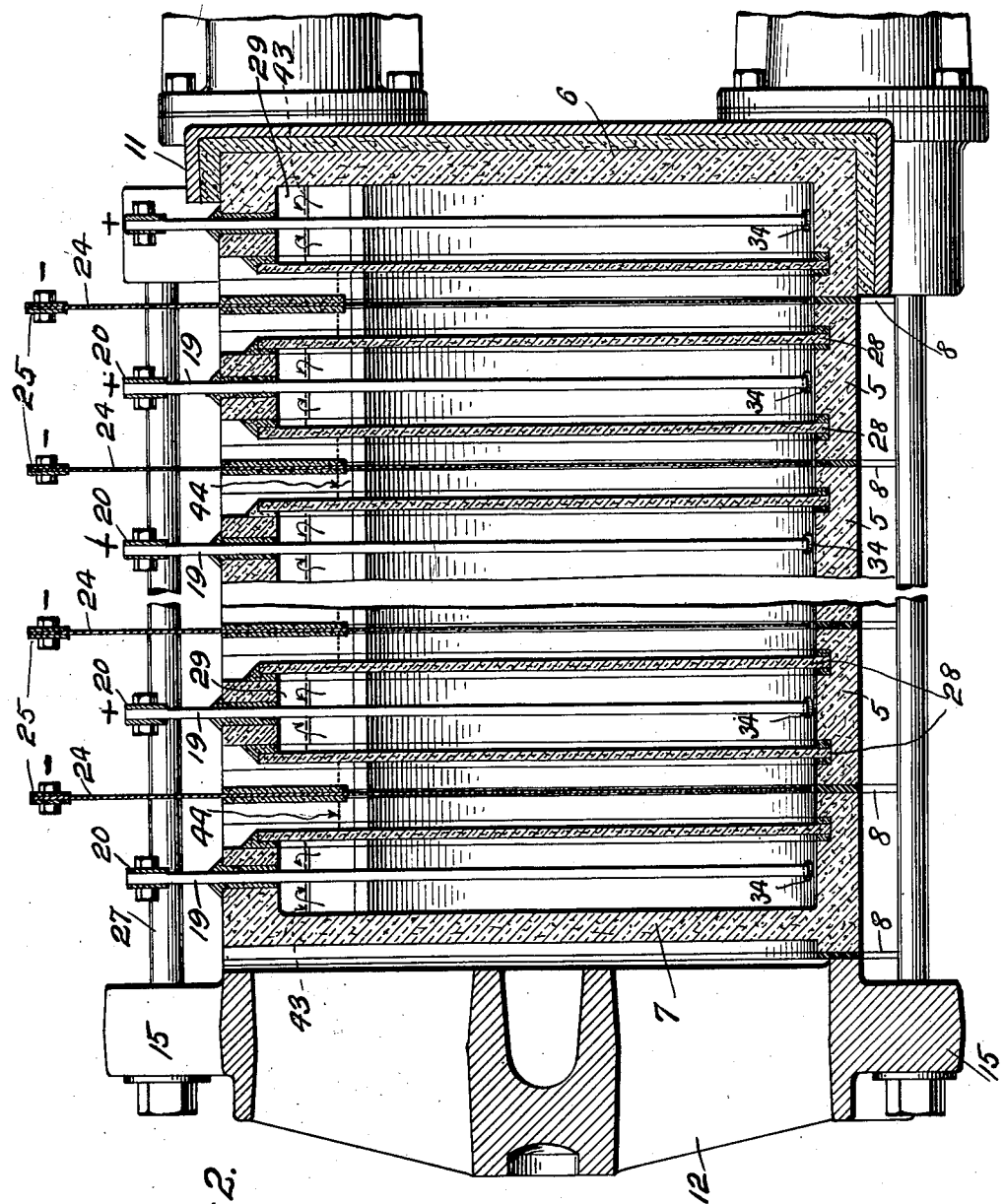

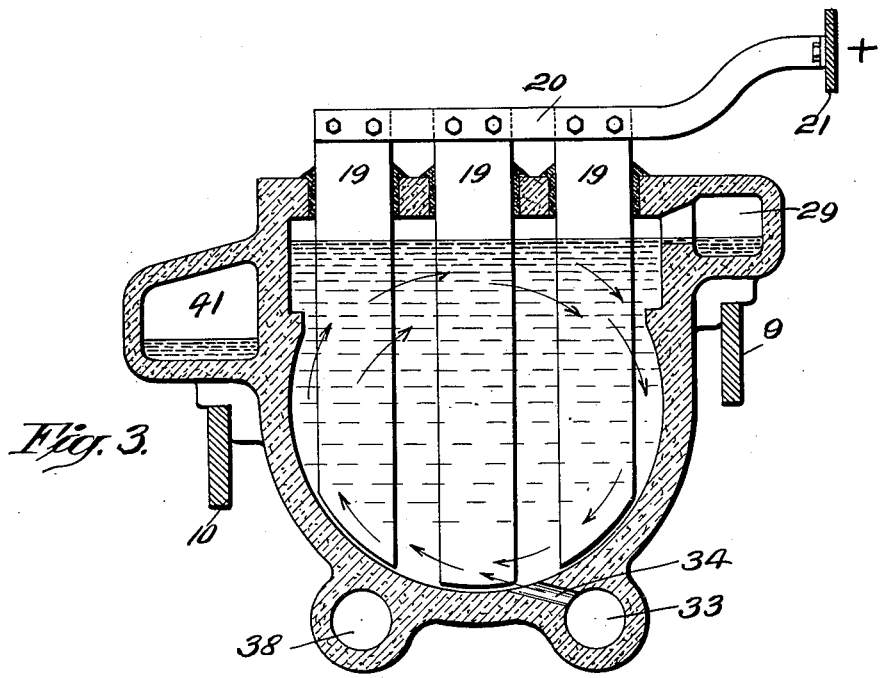
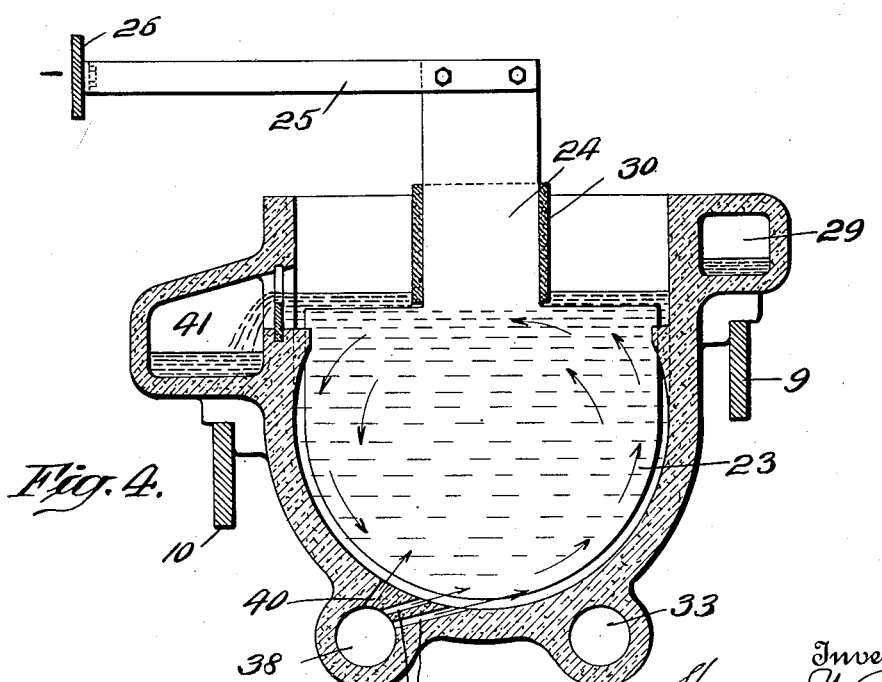

HERMAN W. PAULUS, OF RICHMOND HILL, NEW YORK, ASSIGNOR TO ROYAL BAKING POWDER COMPANY, A CORPORATION OF NEW JERSEY.

METHOD OF AND APPARATUS FOR ELECTROLYTIC REDUCTION AND OXIDATION.

1,420,212.         Specification of Letters Patent.     Patented June 20, 1922.

Application filed July 26, 1920. Serial No. 399,084.

*To all whom it may concern:*

Be it known that I, HERMAN W. PAULUS, a citizen of the United States, and a resident of Richmond Hill, in the county of Queens and State of New York, have invented certain new and useful Improvements in Methods of and Apparatus for Electrolytic Reduction and Oxidation, of which the following is a specification.

The present invention relates to a method of and apparatus for electrolytic reduction and oxidation.

Efficient and economical electrolytic reduction and oxidation are dependent upon the rapidity with which all the particles of the electrolyte move into contact with the electrodes. Rapid circulation and agitation of the electrolyte is necessary to prevent polarization. The agitation is dependent upon the relative movement between the electrodes and the electrolyte. It has heretofore been common practice in order to secure a relative motion of sufficiently high velocity, to move the electrodes rapidly through the electrolyte. The most common construction is to mount the electrodes on a revolving shaft so that they will dip into deep and relatively narrow pockets or cells containing the electrolyte. Although this method prevents polarization, it has proven unsatisfactory because the electrolyte tends to travel with the revolving electrodes and consequently the relative velocity between the two is very small. This results in reduced efficiency. It is obvious that the narrower the pockets the greater is the tendency of the electrolyte to travel with the electrodes. Moreover, revolving electrodes require collector rings, brushes, stuffing boxes and other accessories which complicate the construction and make necessary more or less frequent repairs. Furthermore, in some electrolytic processes, in which an absolutely clean and unoxidized electrode surface is required, it is impossible to assemble a revolving electrode cell quickly enough to prevent some oxidation.

One object of the present invention is to increase the efficiency of electrolytic apparatus adapted for reduction and oxidation and at the same time decrease the expense of operation. This object is accomplished by the improved method of securing a relative movement between the electrodes and the electrolyte. This method consists in holding the electrodes stationary and introducing the electrolyte to the cells in such manner that it will have a positive and relatively rapid movement with respect to the electrodes. The preferred method is to impart a revolving or circulatory movement to the electrolyte. This is effected by constructing a portion of the inner surface of the cell round or cylindrical and forming the inlet passages to the cell tangentially to this rounded portion so that the incoming electrolyte will strike the margin of the electrolyte contained in the cell and thereby impart a revolving or circulatory movement to the electrolyte in the cell and maintain it in that motion. The incoming electrolyte will also strike the rounded portion of the cell and so have imparted to it a gyratory motion which will assist in maintaining the circulatory motion of the electrolyte in the cell. In addition to the tangentially arranged inlet passages one or more inlet passages directed toward the center of the cell may be provided in order that there may be no quiescent portions in the electrolyte.

Another object of the invention is to produce an electrolytic apparatus of improved and simplified construction so as to reduce the cost of manufacture, and so as to reduce the size of the apparatus while maintaining its capacity. The simplified construction and reduced size of the apparatus conduce to the increased efficiency of the apparatus. Further objects of the invention will be pointed out hereinafter as the description proceeds.

In the accompanying drawings illustrating the preferred form of the invention, Fig. 1 is a plan of the improved electrolytic apparatus, with the middle portion shown as broken away; Fig. 2 is a longitudinal, vertical section substantially through the middle of the apparatus shown in Fig. 1; Fig. 3 is a sectional elevation through one of the anode cells; and Fig. 4 is a sectional elevation through one of the cathode cells.

The improved electrolytic apparatus illustrated in the drawings comprises a series of frames or electrolytic cell units, which are composed of some dielectric substance such as chemical stoneware. The anode and the cathode cells alternate with each other and the capacity of the apparatus is increased by the addition of one or more single cell units. This is made possible by the fact that all the intermediate cell units 5 are of uniform size and structure. These intermediate cell units are interchangeable and can occupy any intermediate position in the apparatus. The end units 6 and 7 differ from the intermediate units in that they have only one open side, whereas the intermediate units are open at both sides. The cell unit 6 is the first or front unit and the cell unit 7 is the rear or last unit. Whatever the size of the apparatus, these end cell units always maintain their relative positions. The cell units are separate from each other and made watertight by gaskets 8. The assembled cell units are supported on rods or bars 9 and 10. These supporting bars are of such length as to accommodate additional cell units up to the desired capacity of the apparatus. The forward ends of the supporting bars are connected with a head frame 11 in which the first or front cell unit 6 is inserted as shown in Fig. 2. On the rear free ends of the supporting bars is mounted a follower or crosshead 12 provided with a threaded hole for the accommodation of a screw 13 having a knob or handle 14 provided with holes to receive a rod or bar by which the screw may be turned. The forward end of the screw 13 bears against the rear framehead 15, against the inner face of which the rear or last cell unit 7 is placed. As the number of cell units is increased or diminished, the crosshead 12 is shifted along the supporting bars 9 and 10. The crosshead is secured to the bars in adjusted position by the bolts 16. The screw 13 serves to bind the cell units together. The cell unit supporting bars 9 and 10 may be supported either from the ceiling or from the floor of the room in which the apparatus is placed.

The electrodes are of plate or disc-like form as shown in Figs. 3 and 4. The anodes may be composed of any material suitable for the purpose, such as graphite or iron oxide. Each anode is shown in Fig. 3 as consisting of three relatively narrow plates 19. If desired, the anodes may consist of a single plate. Mechanical expediency will dictate the particular construction. The anode plates are fastened at their upper ends to anode bars 20 which in turn are secured to buss bars 21 extending throughout the length of the apparatus. The cathodes are composed of some metal which does not readily oxidize, such as platinum and certain kinds of steel. It is preferred to use chrome steel for the cathodes. Each cathode consists of a single plate, the lower half of which is disc-like, as shown in Fig. 4. Each cathode plate 23 is provided with a neck 24 which is fastened at its upper end to a cathode lead 25, which in turn is secured to a buss bar 26 extending throughout the length of the apparatus. The anode buss bar 21 conducts the positive current to the anodes and the cathode buss bar 26 conducts the negative current from the cathodes. These buss bars are located on opposite sides of the apparatus as shown in Fig. 1. The electrical wiring connected with the buss bars is not shown inasmuch as these connections are well known.

The intermediate cell units are of uniform size and structure and are interchangeable as pointed out above. Each cell unit is so constructed that it constitutes one complete compartment or electrolytic cell and two one-half compartments or cells. In the apparatus shown in the drawings, the middle section of each intermediate cell unit constitutes an anode cell or compartment, the sides of which are diaphragms 28 composed of some porous and rigid material such as porcelain, alundum, stoneware or similar dielectric substances. The central portion of each cell unit in the apparatus shown constitutes an anode cell because the apparatus shown is used for reduction purposes. If the apparatus is used for oxidation purposes for which it is equally well adapted, the middle portion of each cell unit will constitute the cathode chamber. In the apparatus, as shown, the cathodes are located in line with the joints between the cell units. Thus the outer faces of each cell unit constitute one-half a cell each. The outer face of each cell unit is that part extending from the diaphragms 28 to the outer edges of the cell units. Thus there is one complete cell to each unit, or frame. By means of this construction a considerable saving in floor space is effected; because heretofore, so far as known, it has required three frames to provide two anode cells and one cathode cell. That is to say, each separate frame would constitute either a single anode cell or a single cathode cell. Not only is an economy of floor space effected, but also a considerable saving in the cost of manufacturing the apparatus, inasmuch as the number of cell units to each apparatus is greatly reduced. This economy in floor space and in cost of manufacture is secured while maintaining the capacity of the apparatus. The increased efficiency of the apparatus will be dealt with later on.

In the illustrated embodiment of the invention, the anode cells are shown as completely sealed against the atmosphere. This is done by surrounding the necks of the anode plates with some chemically inert, plastic substance such as clay, putty or asphaltum. The anode cells are shown sealed against the atmosphere because in this apparatus sodium chloride was used as the electrolyte. During the electrolytic action the sodium chloride decomposes into its constituent parts and the chlorine is drawn off through the discharge openings 29 indicated by the arrows in Fig. 2. It will be understood that when the apparatus is used for oxidation purposes the cathode compartments will be sealed against the atmosphere.

The cathode cells are open to the atmosphere as shown in Fig. 2. The active part of each cathode, which is its plate or disc-like part, namely that part by which the electrolytic action is effected, is entirely submerged beneath the surface of the electrolyte as is clearly shown in Fig. 4. The neck 24 of each cathode projects from the electrolyte. Surrounding the neck of each cathode at the point at which it emerges from the electrolyte, is a collar 30 composed of some chemically inert substance such as glass, porcelain or stoneware. This collar 30 acts as a protective covering for the cathode to prevent it from oxidizing at this point. It will be understood as hereinafter pointed out more fully, that the surface of the electrolyte is more or less disturbed and that the electrolyte will rise and fall more or less at the neck of the cathode, thereby intermittently exposing a portion of the cathode to the solution and to the atmosphere, which action superinduces oxidation. If oxidation is permitted to take place at this point, the oxide formed will be reduced to its metallic base and pass into the electrolyte and be deposited upon the active portion of the cathode, thereby interfering with the electrolytic action. By providing this protective covering or collar of chemically inert substance it has been found that the cathodes can be maintained clean and bright and free from oxidation and so be used without replacement for indefinite periods of time. So far as is known, this is the first time that a stationary cathode has been provided with means to prevent oxidation at the point where the cathode emerges from the electrolyte.

In order to secure a high velocity in the relative movement between the electrodes and the electrolyte so as thereby to attain the maximum efficiency and economy of operation, the method of electrolytic reduction and oxidation forming part of the subject-matter of this invention consists in holding the electrodes stationary and moving the electrolyte rapidly relatively to the electrodes. It has been found that the most practical method of securing this rapid movement of the electrolyte is to introduce it into the cell so that it will have a rotary or circulatory movement or path of travel. For this purpose the bottoms of the cells are made rounded or cylindrical as shown in Figs. 3 and 4. The inlet passages or openings for admitting the electrolyte to the cells are formed tangentially to the rounded cell bottoms. By this construction the electrolyte which is admitted under pressure to the cells strikes the margin of the electrolyte already in the cells and imparts a rotary or circulatory motion thereto, and the incoming electrolyte also impinges on the rounded portion of the cells so that its path of travel is thereby deflected and it is given a gyratory movement.

The electrolyte for the anode cells enters the apparatus by a pipe-head 32 which is connected by conduits 33 formed along one side of the bottom of the cells. These conduits 33 register with each other and holes are made in the gaskets separating the cell units so that the conduits 33 constitute a single feed pipe for supplying the anode cells with the electrolyte or anode liquor. The anode liquor under pressure enters the anode cells by openings 34 formed in the bottom of the cell units. The openings 34 are formed tangentially to the rounded bottom portion of the cells as shown in Fig. 3. The overflow from the anode cells passes out through the discharge pipe 29 which is located along one upper edge of the apparatus and is formed in the same manner as the feed pipe 33. The anode liquor passes from the apparatus through a pipe-head 35. The pipe-heads 32 and 35 are connected with a supply tank and with a pump. These connections are not shown because they form no part of the invention. The electrolyte for the cathode cells, which is known as the cathode liquor, enters the apparatus by the pipe-head 37 and flows through the feed pipe 38 which is composed of conduit openings which are formed on the bottom of the cell units and on the side opposite to the conduits 33.

The cathode liquor is admitted to the cathode cells through relatively restricted openings 39 which are formed tangentially to the rounded portion of the cathode cells. The electrolyte entering the cathode cells has the same action as the electrolyte entering the anode cells, but because the electrolyte entering the cathode cells enters through smaller openings and is under greater pressure, the rotary or circulatory movement of the electrolyte in the cathode cells is greater than that in the anode cells. In order that there may be no quiescent part in the electrolyte in the cathode cells, one or more openings 40 may be provided directed toward the center of these cells. The overflow electrolyte from the cathode cells passes out through a discharge pipe formed along the upper edge of one side of the apparatus. The discharge pipe 41 opens into a pipe-head 42. The pipe-heads 37 and 42 are connected with a supply tank and with a pump.

It will be observed that the electrolyte entering the anode cells travels in an opposite direction to the path of travel of the electrolyte entering the cathode cells. This arrangement of introducing the electrolyte into the two kinds of cells secures a countercurrent agitation in the adjacent compartments to counteract any tendency toward unequal current distribution. This construction promotes the efficiency of the apparatus and constitutes one of the features of the invention.

The apparatus of the present invention may be used for any kind of organic or inorganic reduction and oxidation. The invention has been described in connection with an apparatus particularly adapted for use in the conversion of sodium and potassium glyoxylate into their corresponding tartrates. It will be recognized that this chemical action requires the utmost in exacting conditions in order to be commercially successful. The present invention meets these requirements. It will be recognized, however, that the invention is not to be restricted to this purpose and use because it is obvious that it is equally adapted for use in connection with any other kind of electrolytic reduction or oxidation.

When the apparatus is put into operation a circulation of the proper kind of anode liquor is maintained through the anode cells and in like manner a circulation of the proper kind of cathode liquor is maintained through the cathode cells. In converting sodium glyoxylate into sodium tartrate the anode liquor consists of sodium chloride and the cathode liquor consists of a mixture of sodium chloride and sodium glyoxylate. This latter solution is very expensive, and accordingly, in order that none of it may be lost or wasted by passing into the anode cells, the solution in the anode cells is raised to a higher point than the solution in the cathode cells, as clearly appears in Fig. 2 where the reference numeral 43 designates the surface of the anode liquor and the reference numeral 44 designates the surface of the cathode liquor. As the soduim chloride solution in the anode cells is decomposed by the electrolytic action there is a constant seepage of the liberated sodium from the anode cells into the cathode cells. The electrolytic action which takes place in converting the sodium glyoxylate into sodium tartrate is satisfactorily explained by the theory that as the stream of sodium chloride ions pass from the anodes to the cathodes through the solution occupying the interstices of the diaphragms, they lose the chlorine atom at the anodes and deposit the sodium atom on the cathodes. The sodium atom deposited on the cathode immediately combines with the water in the solution constituting the electrolyte in the cathode cell so that caustic soda is formed and hydrogen is liberated. This liberated atom of hydrogen combines with a molecule of sodium glyoxylate and thereby converts it into sodium tartrate. Inasmuch as the particular chemical process which takes place forms no part of the invention it is unnecessary to go into further explanation of the chemical reactions caused by the electrolysis.

The principles of the invention have been pointed out in the foregoing description taken in connection with an illustrated embodiment of the invention. It will be understood that the invention is not to be restricted to the form of apparatus shown and described, but that it may be embodied in other forms without departing from the spirit or scope of the following claims.

Having thus described the invention, what is claimed as new is:—

1. An apparatus for electrolytic reduction and oxidation comprising a cell adapted to contain electrolyte, a stationary plate like electrode in the cell, and means for admitting the electrolyte to the cell so that it will have a rotary motion relatively to the surface of the electrode.

2. An apparatus for electrolytic reduction and oxidation comprising a cell adapted to contain electrolyte, said cell having a cylindrical bottom, openings for admitting electrolyte to the cell, said openings being formed tangentially to the cylindrical bottom of the cell so as to impart a rotary motion to the electrolyte as it enters the cell.

3. An apparatus for electrolytic reduction and oxidation comprising a cell adapted to contain electrolyte, an electrode in the cell, openings in the bottom of the cell for admitting electrolyte thereto, said cell having a rounded portion opposite the openings so that as the electrolyte enters the cell it will be given a rotary motion relatively to the electrode.

4. An apparatus for electrolytic reduction and oxidation comprising a cell adapted to contain electrolyte, an electrode in the cell, openings for admitting electrolyte to the cell, said openings being formed so that as the electrolyte enters the cell it will strike a portion of the cell and be deflected thereby from its normal path of travel.

5. An apparatus for electrolytic reduction and oxidation comprising a cell adapted to contain electrolyte, a vertically arranged electrode in the cell, said cell having a rounded bottom portion, inlet openings in the bottom of the cell for admitting electrolyte to the cell so directed as to give the electrolyte a rotary motion with respect to the electrode, and a discharge opening at the top of the cell and on the same side as the inlet opening.

6. An apparatus for electrolytic reduction and oxidation comprising a cell adapted to contain electrolyte, a vertically arranged stationary electrode in the cell, openings in the cell for admitting electrolyte thereto, said cell being provided with means to deflect the electrolyte as it enters the cell so that it will have a constantly changing path of travel with respect to the electrode.

7. An apparatus for electrolytic reduction and oxidation comprising a series of alternating anode and cathode cells, an anode in each anode cell and a cathode in each cathode cell, an opening in the bottom of each cell for admitting electrolyte thereto, the openings being so formed that the electrolyte entering the anode cells travels in a different direction from the electrolyte entering the cathode cells.

8. An apparatus for electrolytic reduction and oxidation comprising a series of alternating anode and cathode cells, an anode in each anode cell and a cathode in each cathode cell, the cells being provided with rounded bottoms, openings in the cells for admitting electrolyte thereto, said openings being formed tangentially to the rounded bottoms.

9. An apparatus for electrolytic reduction and oxidation comprising a series of anode and cathode cells, an anode in each anode cell and a cathode in each cathode cell, said cells being provided with rounded portions, openings in the cells for admitting electrolyte thereto, said openings being formed tangentially to the rounded portion so that a rotary motion is imparted to the electrolyte as it enters the cells, the openings for the electrolyte entering the anode cells and the openings for the electrolyte entering the cathode cells being formed so as to cause the electrolyte flowing through them to pass into the cells from opposite directions.

10. An apparatus for electrolytic reduction and oxidation comprising a series of anode and cathode cells, an anode in each anode cell and a cathode in each cathode cell, said cells having a cylindrical bottom, openings in one side of the bottom of the anode cells for admitting electrolyte to the anode cells and openings on the opposite side of the bottoms of the cathode cells for admitting electrolyte to the cathode cells.

11. An apparatus for electrolytic reduction and oxidation comprising a series of anode and cathode cells, an anode in each anode cell and a cathode in each cathode cell, and means for admitting electrolyte to the cells so that the electrolyte entering the anode cells will have a path of travel opposite to the electrolyte entering the cathode cells.

12. An apparatus for electrolytic reduction and oxidation comprising a series of electrolytic cell units, each intermediate cell unit being of uniform size and structure, each cell unit comprising a middle portion which constitutes an anode cell having diaphragm side walls and each outer face of the cell unit constituting one half of the adjacent cathode cells.

13. An apparatus for electrolytic reduction and oxidation comprising a series of cell units, the intermediate cell units being of uniform size and structure, each intermediate cell unit constituting a complete anode cell and two half cathode cells, an anode in each anode cell and a cathode in each cathode cell, the anodes being arranged to occupy the middle of each intermediate cell unit and the cathodes being arranged to be in line with the joints between the cell units.

14. An apparatus for electrolytic reduction and oxidation comprising a series of cell units, the intermediate units being of uniform size and structure, each cell unit serving as one complete cell for an electrode of one polarity and two half cells for an electrode of opposite polarity, the electrode of the first polarity occupying the middle of the cell unit and the electrodes of the opposite polarity being in line with the joints between the cell units.

15. An electrolytic apparatus comprising a cell adapted to contain electrolyte, a cathode in the cell having its active part submerged below the surface of the electrolyte and a covering of inert chemical substance surrounding the part of the cathode projecting from the electrolyte so as to prevent oxidation thereof.

16. An electrolytic apparatus comprising a cell adapted to contain electrolyte, a cathode in the cell consisting of a plate-like active portion submerged below the surface of the electrolyte, a neck portion projecting from the electrolyte and a covering of chemically inert substance surrounding the neck of the cathode to prevent oxidation thereof.

17. An electrolytic apparatus comprising a cell adapted to contain electrolyte, an electrode in the cell, a part of which is submerged below the electrolyte and a part of which projects from the electrolyte and a covering of a chemically inert substance surrounding the portion of the electrode at the surface of the electrolyte so as to prevent oxidation thereof.

18. A method of electrolytic reduction and oxidation which comprises introducing the electrolyte into an electrolytic cell having a stationary electrode therein so that its path of travel as it enters the cell will be gyratory with respect to the electrode.

19. A method of electrolytic reduction and oxidation which comprises introducing the electrolyte into the anode and cathode cells so that the path of travel of the electrolyte will be in one direction in the anode cell and substantially in the opposite direction in the cathode cell.

20. The method of electrolytic reduction and oxidation which comprises introducing the electrolyte into the cell under pressure through relatively narrow openings and deflecting the path of travel of the electrolyte as it enters the cells so that it will have a rotary or circulatory movement with respect to the electrodes.

HERMAN W. PAULUS.